March 18, 1930. M. E. BOSLEY 1,751,454
WEATHER STRIPPING
Filed April 4, 1924
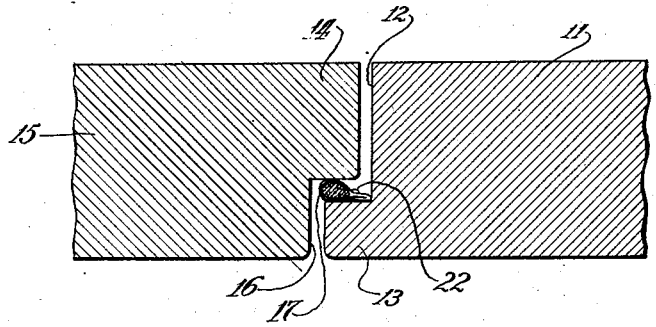
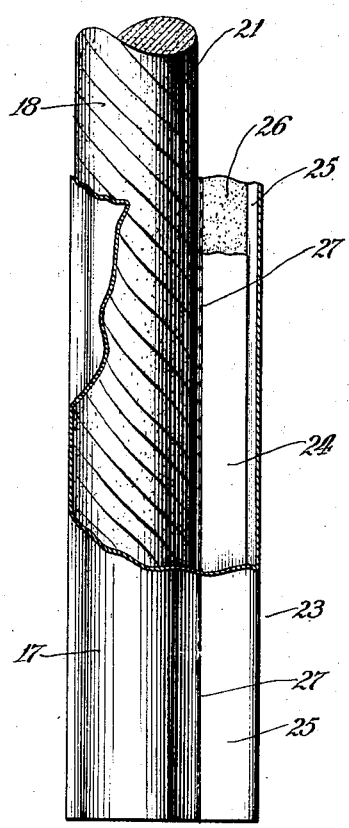
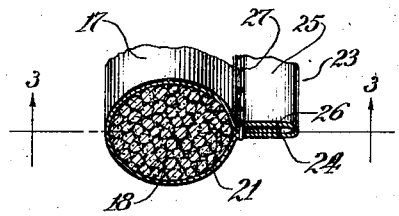
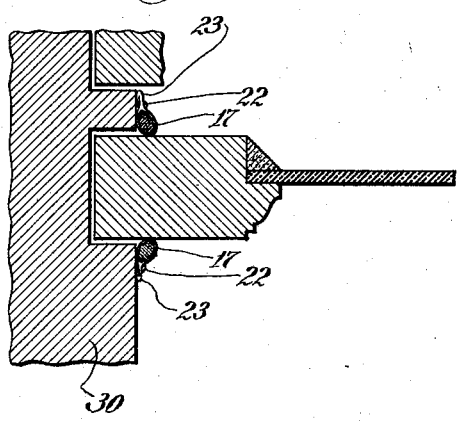
Inventor;
Maurice E. Bosley
By Munday, Clarke & Carpenter
Attys.

Patented Mar. 18, 1930

1,751,454

UNITED STATES PATENT OFFICE

MAURICE E. BOSLEY, OF CHICAGO, ILLINOIS

WEATHER STRIPPING

Application filed April 4, 1924. Serial No. 704,112.

The invention relates to weather strips employed for sealing the space between relatively movable or opening and closing members, such as doors and windows of houses, doors of ice boxes, etc.

The primary object of the invention is the provision of a weather stripping of the character described which is adapted to be securely positioned upon the frame in which the door or window is mounted and is, to a certain degree, compressible so that it forms an effective seal preventing the passage of air and to assist in maintaining an even temperature in the room or ice box.

A further object of the invention is to provide a weather stripping which is practically integrally formed and having a reinforced marginal portion suitable for attachment to the door, or frame, said marginal portion being integrally constructed without the employment of metal edging and yet which is imbued with strong, rigid and durable qualities.

A further object of the invention is the provision of weather stripping having the foregoing advantages and which will be inexpensive to manufacture.

Other objects and advantages of the invention will be apparent as it is better understood from the following description, which, taken in connection with the accompanying drawings, discloses a preferred embodiment thereof.

Referring to the drawings:

Figure 1 is a horizontal sectional view of the edge of a door or casing provided with weather stripping constituting a preferred embodiment of the invention;

Figure 2 is an enlarged perspective view, showing to better advantage the internal construction and the manner of forming the integral reinforced marginal portion;

Figure 3 is a side elevation of a portion of the stripping, partially broken away to better illustrate the construction of the same; and Figure 4 is a horizontal detail section of a portion of a window and frame having the invention attached thereto.

Refering to the drawings, 11 illustrates the portion of the door frame which is cut away at 12 to provide a jamb 13 against which a flange 14 of the door 15 is adapted to close, said flange being formed by cutting away the door edge, as indicated at 16, so that the two members may be substantially in alignment when the door is closed.

The weather stripping provided by the present invention comprises a piece of fabric 17, which is preferably impregnated with a rubber compound, or otherwise suitably treated to give it a hard finish, and a packing composed of a wicking 18 is enclosed within the main fold of said fabric. The wicking 18 is composed of soft, twisted strands 21 which are expansible under pressure, so that a tight seal is effected when the door flange 14 is closed against the stripping.

The weather stripping is adapted to be secured to the door jamb 13 or window frame 30 by means of tacks 22, or other fastening devices, which are applied to the marginal portion, indicated as an entirety by 23. The qualities of the wicking 18 above pointed out, are such that the stripping is caused to conform to the closed surface of the door flange 14 and jamb 13 so that an effective seal is provided. Furthermore, within certain limits, the stripping described is conformable to cracks of varying width, so that it may be used in connection with doors, or windows which do not close in proper alignment with the frame.

One edge of the folded fabric 17 constitutes a marginal flange 24 which is enclosed, or contained within the folded remaining edge 25 of said fabric, as clearly shown in Fig. 3, to provide the integral reinforced marginal portion 23, suitable for attachment to the frame. A coating or layer of waterproof rubber cement 26 or other adhesive material is interposed as a binder between the contiguous portions of the marginal flanges 24 and 25, and the superposed layers of the entire marginal portion 23 are preferably stitched together as at 27 to further reinforce the structure. It will be further apparent that this manner of forming the marginal portion of the stripping serves to effectually confine the wicking 18 within the main fold of the fabric and permits limited expansion and compression of said wicking within the fabric when pressure is applied to the stripping.

The construction above described provides a weather stripping having a reinforced marginal portion which is formed integrally with the fabric, and without the use of metal strips, or other separate reinforcing strips generally employed.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A weather stripping for sealing the space between co-operating closure members, comprising a strip folded intermediate its free edges to provide by the junction of said edges a tubular portion and outwardly extending free edges, a yieldable portion enclosed within said tubular portion, one of said free edges being longer than the other and arranged to lie in contact with one face of the shorter edge, and thence extending a fold over the free raw edge of the shorter edge and extending to the junction of said tubular portion and said shorter edge to wholly enclose said shorter edge, a stitching securing the three plies formed by said shorter edge and said folded longer edge substantially at said junction and waterproof adhesive material interposed between said opposite face and the adjacent folded over face of the longer edge of said strip, whereby said single stitch and such waterproof adhesive material maintain said tubular portion and said folded plies in position while providing a relatively stiff marginal tacking flange adapted to exclude moisture from entering the interior of said flange.

2. A weather stripping for sealing the space between co-operating closure members, comprising a folded strip of fabric having a yieldable packing enclosed within said fold, one edge of said folded strip being enclosed within and stitched to the folded remaining edge of said strip to provide an integral three ply marginal portion adapted to be secured to one of said closing members, the contiguous or adjacent faces of two of said plies being cemented together by waterproof cement, whereby to lend rigidity to said tacking flange, to exclude moisture therefrom and to hold said plies in position.

3. A weather stripping for sealing the space between co-operating closure members, comprising a strip of fabric folded to provide a main fold, yieldable packing enclosed within said main fold, the free edges of said strip being interfolded so that one edge of said strip is wholly enclosed within an over-fold formed on the other edge of said strip, to provide a tacking flange consisting of a plurality of plies and a row of stitches passing through said plies adjacent the main fold and a layer of waterproof cement between inner adjacent faces of the enclosed edge and the over-folded edge of said strip, to provide a moistureproof multi-ply tacking flange.

4. A gasket comprising, a roll, an envelope enclosing said roll and having its free edges extended to provide a tacking lap and an inside line of stitches passing through the envelope plies along said roll and adapted to confine the same in order to provide a tight but yielding packing, said plies being adhesively secured together beyond said line of stitches in order to stiffen the tacking lap.

MAURICE E. BOSLEY.